United States Patent
Kuwakino

(10) Patent No.: US 6,865,036 B1
(45) Date of Patent: Mar. 8, 2005

(54) LENS DRIVE DEVICE AND LENS DEVICE CAPABLE OF SETTING AN OPTIMUM BRAKING CHARACTERISTIC

(75) Inventor: Koshi Kuwakino, Omiya (JP)

(73) Assignee: Fuji Photo Film Co., Ltd., Saitama (JP)

( * ) Notice: Subject to any disclaimer, the term of this patent is extended or adjusted under 35 U.S.C. 154(b) by 187 days.

(21) Appl. No.: 09/661,292

(22) Filed: Sep. 13, 2000

(30) Foreign Application Priority Data

Sep. 13, 1999 (JP) ............................................ 11-258979

(51) Int. Cl.$^7$ .......................... G02B 7/02; G03B 13/00; G03B 13/34; G03B 17/00; G03B 3/10
(52) U.S. Cl. ........................ 359/824; 348/347; 396/86; 396/133
(58) Field of Search ................................ 359/822–824, 359/827, 694; 396/85, 86, 88, 91, 133, 135, 136, 147; 348/347, 333.02, 358

(56) References Cited

U.S. PATENT DOCUMENTS

| | | | |
|---|---|---|---|
| 4,772,909 A | | 9/1988 | Ogasawara |
| 4,931,823 A | * | 6/1990 | Nakajima et al. ........... 396/236 |
| 4,945,371 A | | 7/1990 | Hashimoto et al. |
| 5,164,860 A | * | 11/1992 | Suzuki et al. .................. 396/88 |
| 5,493,357 A | * | 2/1996 | Hara et al. ................... 396/133 |
| 5,731,920 A | * | 3/1998 | Katsuragawa ................ 359/827 |
| 5,826,117 A | * | 10/1998 | Kawamura et al. ........... 396/79 |
| 5,859,733 A | * | 1/1999 | Miyano et al. .............. 359/824 |
| 6,035,137 A | * | 3/2000 | Kaneko et al. ................ 396/86 |
| 6,292,313 B1 | * | 9/2001 | Kanayama et al. .......... 359/823 |
| 6,535,691 B1 | * | 3/2003 | Kobayashi ................... 396/136 |

FOREIGN PATENT DOCUMENTS

JP          4-212941          8/1992

* cited by examiner

*Primary Examiner*—Georgia Epps
*Assistant Examiner*—Alicia M Harrington
(74) *Attorney, Agent, or Firm*—Birch, Stewart, Kolasch & Birch, LLP

(57) ABSTRACT

A unit for inputting a set value of a braking characteristic near the end of a zooming operation area, and a storage unit for storing an initial set value are provided for a servo module (lens drive device), and the servo module can change the settings of the braking characteristic. The servo module is detachably mounted to a lens device body and contains a CPU, and is provided with A/D converters for A/D converting an analog control signal and a lens position signal for focus and zoom from the lens device body, and a digital signal communications interface. A parameter value of the braking characteristic can be changed by operating a switch unit. Memory stores an initial set value of the braking characteristic, and the initial set value can be restored as necessary. In addition, an indicator (lens status display portion) mounted in the lens device body is used as a unit for checking the parameter value of the braking characteristic.

4 Claims, 10 Drawing Sheets

F I G. 4
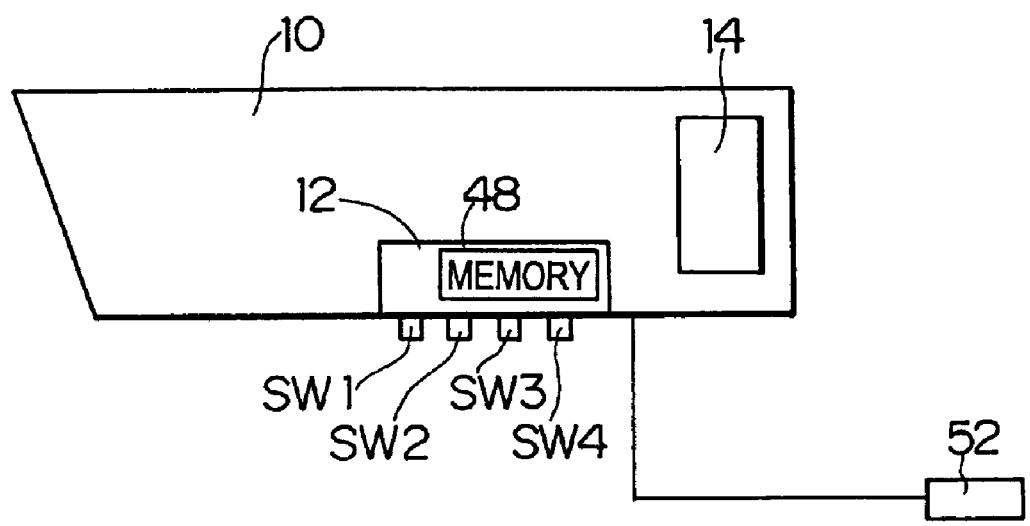

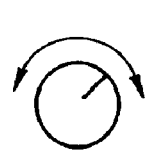
F I G. 10 (A)
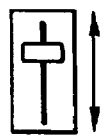
F I G. 10 (B)
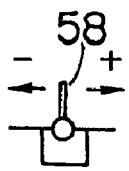
F I G. 10 (C)
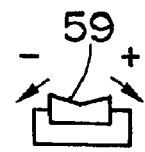
F I G. 10 (D)
F I G. 11
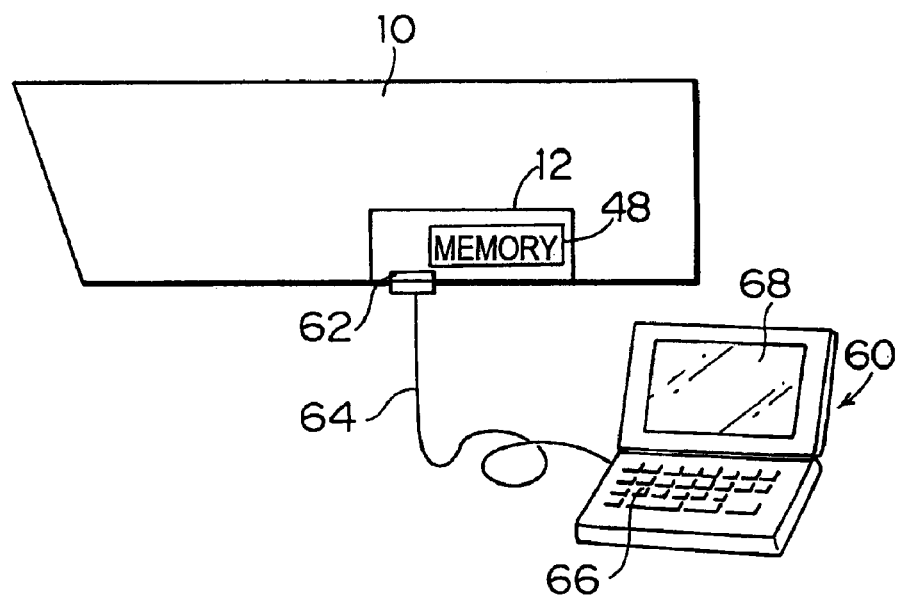

F I G. 1 3
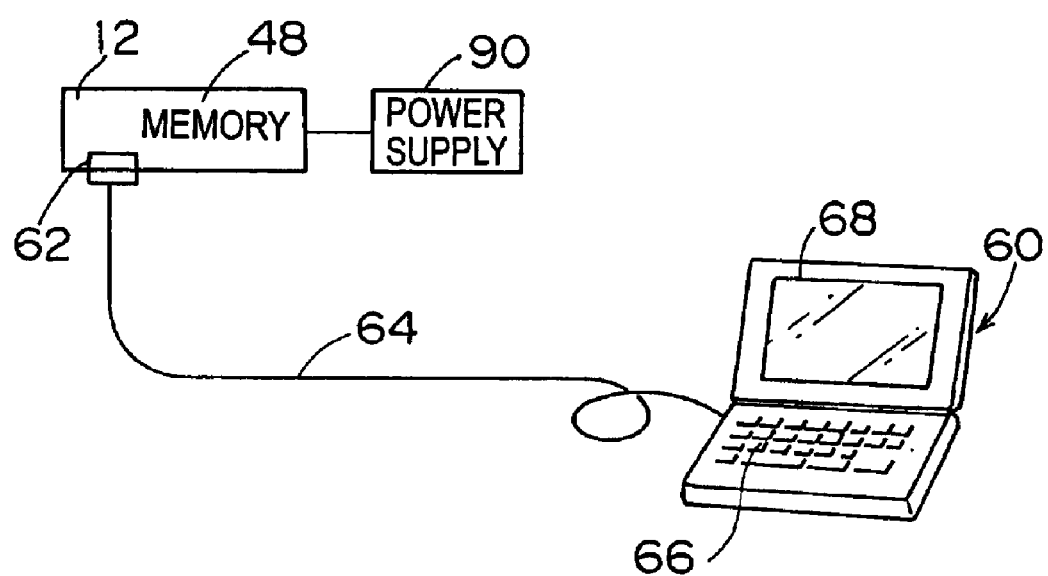

LENS DRIVE DEVICE AND LENS DEVICE CAPABLE OF SETTING AN OPTIMUM BRAKING CHARACTERISTIC

BACKGROUND OF THE INVENTION

1. Field of the Invention

The present invention relates to a lens drive device and a lens device, and more specifically to a lens drive device which is applied to a servo unit or the like detachably mounted to a TV lens body and functions as a drive portion for a focusing operation and a zooming operation of a lens system, and to a lens device which uses the drive device.

2. Description of Related Art

Currently, the speed of the zooming operation of a TV lens is required to be high for a quick shooting operation, and the lens moves from the telephoto end to the wide angle end (or from the wide angle end to the telephoto end) at a maximum speed of 0.6 sec. Therefore, to prevent a clank or the mechanical damage at the telephoto end or the wide-angle end, the speed-reduction control is performed for operating a brake before each stroke end. Since the force (of inertia, of friction, etc.) applied to the drive system depends on the TV lens model having each lens configuration and zooming mechanism structure, each model has its own optimum reduction characteristic (control method for realizing quick and smooth reduction).

However, since it is not clear in what type of TV lens the lens drive device referred to as a servo module detachably mounted to a lens body is mounted, the device is designed to have an average braking characteristic (with least common adjustments) in order to be used for each model.

In addition, in a servo module operating according to an analog signal, a general-purpose servo module has been conventionally used with analog (trimmer) adjustments, and the optimum braking characteristic has been assigned to a specific type of TV lens by trimmer adjustments. However, these adjustments are complicated, and further adjustments are required in a case where the servo module is re-mounted in another TV lens. Furthermore, it is difficult to restore the adjustments to initial values set at the delivery from the factory. Thus, the conventional servo module has lacked in generality.

On the other hand, the lens device disclosed by Japanese Patent Laid-Open No. 4-212941 includes means for detecting the type of movable lens, and is configured such that the brake operation position near the lens moving stroke end and the moving characteristic can be automatically set depending on the type of movable lens. However, to realize the automatic settings, it is necessary for the servo module side to receive necessary information from the lens body. Therefore, the technology cannot be used for the purposes other than the combination of the lens body and the servo module having the function of transmitting information. That is, it has the problem that an appropriate braking characteristic cannot be set in the case where the lens body itself is not provided with information providing means as in the aspect in which a servo module of digital type is applied to a lens body of analog type.

SUMMARY OF THE INVENTION

The present invention has been developed based on the above mentioned background, and aims at providing a general-purpose lens drive device and lens device capable of setting the optimum braking characteristic for each model of lens to be mounted.

To attain the purpose, the present invention is directed to a lens drive device to be detachably mounted to a lens device body, comprising: a storage device which stores information prescribing a braking characteristic of a moving object driven by the lens drive device; an input device which inputs a signal for changing the braking characteristic; and a braking characteristic setting device which changes settings of the braking characteristic according to the signal received from the input device.

According to the present invention, the lens drive device is designed to be detachably mounted to each type of lens device body to function as a drive portion for driving a moving object such as a movable lens. When a signal instructing a change of a braking characteristic is input through the input device, the settings of the braking characteristic can be changed by the braking characteristic setting device according to the signal. Thus, the optimum braking characteristic can be set for each model of lens. Furthermore, by the storage device storing the information (for example, the information indicating the values set at the delivery from the factory) about the initial settings of the braking characteristic, the information can be read from the storage device at any time, and the settings of the braking characteristic indicated by the information can be restored.

As an aspect of the input device, there is communications device for receiving information from other external devices such as a lens body, an operating unit, etc. provided in a lens drive device body. A lens controller connected to a lens drive device, a lens device body, or a camera through wire or radio signal transmission device can also be used as the input device. Otherwise, the function of the input device can be assigned to a lens controller.

Preferably, at least one of a lens status display portion attached to the lens device body and a display device which displays an image captured by a camera equipped with the lens device is used as a display device which confirms set contents of the braking characteristic. According to the above-mentioned aspects, it is not necessary to separately add a display device, and the lens device or the resources of the shooting device including a camera can be effectively used.

The present invention is also directed to a lens device on which the above-described lens drive device to be detachably mounted, comprising a display portion which displays a status of a lens and which is used as a display portion which displays information about settings of the braking characteristic.

When the settings of the braking characteristic are changed, the display function of the display portion of the lens device is switched, and the set contents of the braking characteristic and the contents of a change instruction are displayed on the display portion. Thus, the configuration of the lens drive device can be simplified by using the display portion attached to the lens body also as the display device for displaying the information about the settings of the braking characteristic.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 shows a first embodiment of the present invention;

FIGS. 10(A)–10(D) show practical examples of an inputting switch shown in FIG. 9;

FIG. 11 shows a third embodiment of the present invention;

FIG. 13 shows an example of a variation of a third embodiment shown in FIG. 11.

DETAILED DESCRIPTION OF THE PREFERRED EMBODIMENT

Preferred embodiments of a lens drive device according to the present invention will be described in detail below by referring to the attached drawings.

Figure 1:
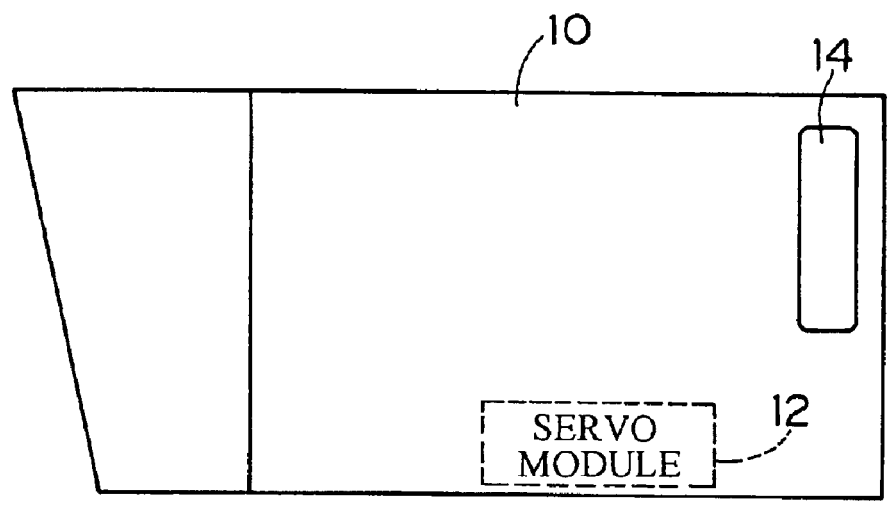
FIG. 1 shows an outline of a TV lens to which the present invention is applied.

FIG. 1 shows an outline of a TV lens to which the present invention is applied. As shown in FIG. 1, the TV lens is configured by a removal unit for a servo module 12 provided at the bottom of the body of a lens device 10 with the side of the body provided with an indicator 14 for displaying the respective states of the zoom, the iris, and the extender.

Figure 2:
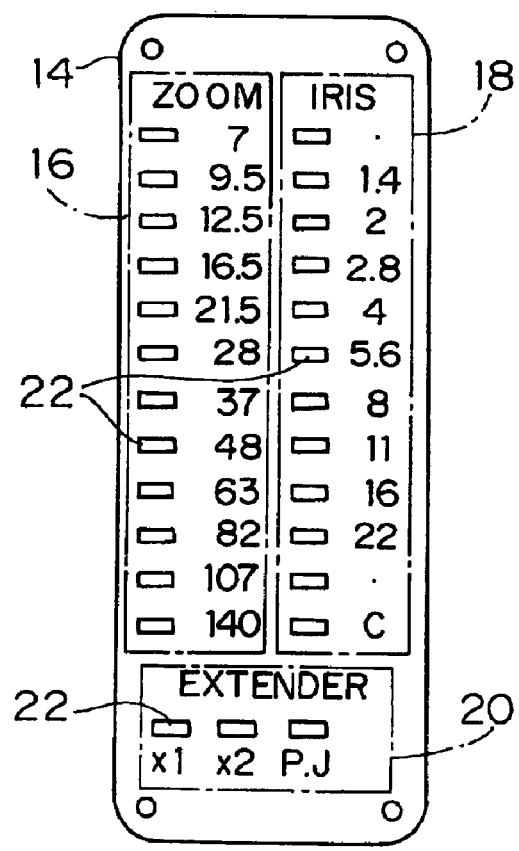
FIG. 2 shows an example of an indicator provided in a lens device shown in FIG. 1.

FIG. 2 shows an example of the indicator 14. In FIG. 2, the indicator 14 comprises a zoom display portion 16 for displaying the focal length of the zoom, an iris display portion 18 for displaying the stop value, and an extender display portion 20 for displaying the magnification of the extender. Each of the display portions (16, 18, 20) is assigned numerals and characters indicating a focal length, a stop value, the magnification of the extender, etc. and an emission window 22 of a lamp corresponding to each display value. The status of the lens can be displayed by lighting the lamp.

For example, the zoom display portion 16 has the structure in which the value of the focal length can be displayed in twelve levels. According to the present embodiment, the zoom display portion 16 is also used as a unit of displaying a set value of a braking control parameter.

Figure 3:
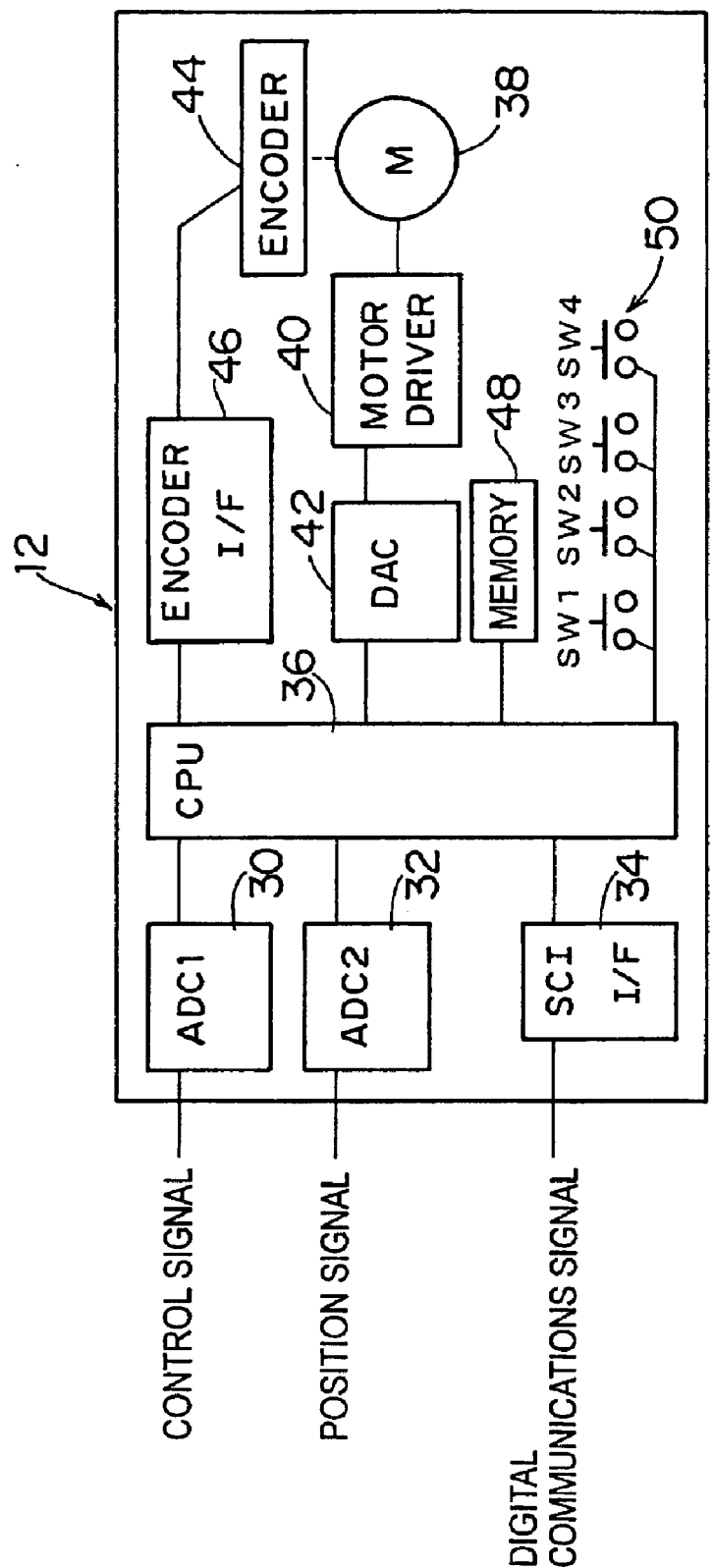
FIG. 3 is a block diagram of a configuration of a servo module.

FIG. 3 is a block diagram of the configuration of the servo module 12. The servo module 12 comprises: an A/D converter 30 for converting a control signal in an analog format provided from a body of the lens device 10 and the lens controller (not shown in FIG. 3) for a zoom demand, etc. into a digital signal; an A/D converter 32 for converting an analog signal (position signal) indicating the lens position provided from the body of the lens device 10 into a digital signal; a digital signal communications interface 34 for providing the interface with the body of the lens device 10; a central processing unit (CPU) 36 corresponding to the control unit of the servo module 12; a motor 38 for driving the lens as a power source; a motor driver (motor drive circuit) 40; a D/A converter 42 for D/A converting a motor drive signal output from the CPU 36 and providing the result for the motor drive circuit 40; an encoder 44 for detecting the revolution of the motor 38; an encoder interface 46 for transmitting the detection signal of the encoder 44 to the CPU 36, a non-volatile memory (for example, EEPROM) 48 storing data such as a braking control parameter, etc.; and a switch unit 50 for inputting various instructions to switch the display function of the indicator 14, etc. A control signal and a position signal are input to the CPU 36 through the A/D converters 30 and 32, respectively. When the lens device 10 is a lens device (digital lens) for digital control, various digital data can be transmitted and received through two-way communications between the lens device 10 and the servo module 12 through the digital signal communications interface 34.

The CPU 36 outputs a motor control signal according to a received control signal. The motor control signal is input to the motor driver 40 through the D/A converter 42, converted by the motor driver 40 into a motor drive signal, and applied to the motor 38. Thus, the motor 38 is driven according to the contents of the instruction of the control signal. The revolution of the motor 38 is detected by the encoder 44, and the detection signal is returned to the CPU 36 through the encoder interface 46, and is used for revolution control of the motor 38.

The switch unit 50 comprises four switches SW1 to SW4. The switch unit 50 is arranged at the position so that the switch unit 50 can be operated even when the servo module 12 is mounted on the body of the lens device 10; for example, at the switch unit 50 is arranged at the bottom of the servo module 12 as shown in FIG. 4.

In FIG. 4, reference numeral 52 denotes a lens controller. The lens controller 52 is a control unit for providing a control signal for the servo module 12, and outputs a control signal corresponding to an operation of an operating member. An aspect of the lens controller 52 can be a zoom demand, a focus demand, a shot box, etc. The lens controller 52 can be connected to the body of the lens device 10 or the servo module 12.

The functions of the switches SW1 to SW4 of the servo module 12 are as follows. The SW1 is a switch for indicating an interruption for setting a braking control parameter. When a braking control parameter is changed, the SW1 is pressed to generate an interruption signal for switching the functions of the setting-specified input device or the display device (output device) for displaying the set contents. Therefore, to set the braking control parameter, the switch SW1 is necessarily pressed when the switches SW2 to SW4 are input.

The current set contents are displayed on the indicator 14 by simultaneously pressing the SW1 and SW2. In this display state, a braking pattern is changed by operating an input device of a parameter. The contents indicated by the input device are displayed in real time on the display device. By simultaneously pressing the SW1 and SW3, the current braking control parameter indicated by the indicator 14 is stored as a new parameter in the memory 48.

By simultaneously pressing the switches SW1 and SW4, the braking control parameter is restored to the initial value (initial value set at the delivery from the factory) stored in the memory 48 in the servo module 12. However, if the initial value is contained in the data provided from the lens side when the switches SW1 and SW4 are simultaneously turned ON to communicate with the lens device 10 upon power is supplied, the value is set.

Figure 5:
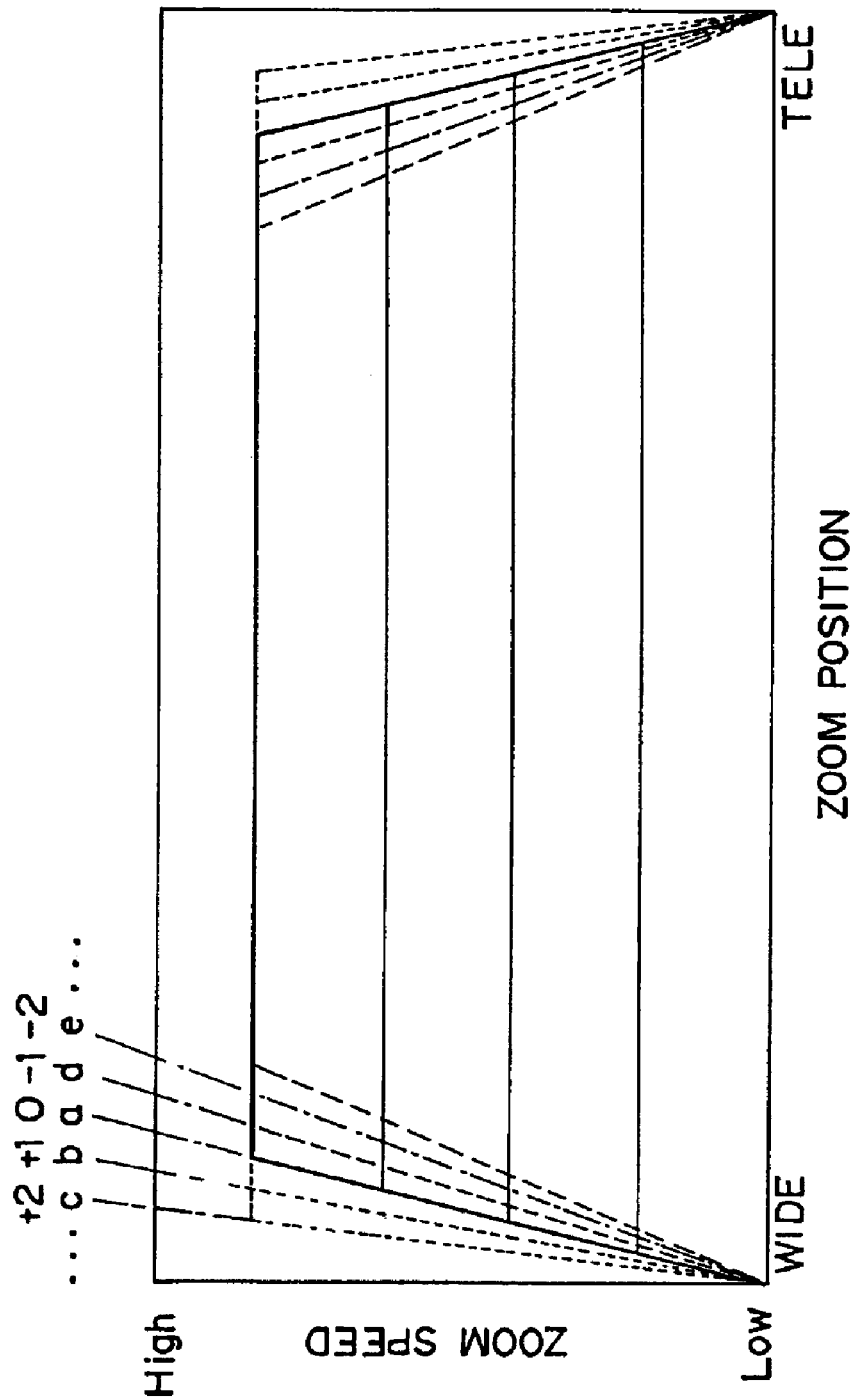
FIG. 5 shows a braking characteristic depending on the zooming position to the operation speed of a zooming operation.

FIG. 5 shows a pattern of the braking characteristic for a zoom lens. As shown in FIG. 5, the positions where the brake works (brake working positions) before the telephoto end and the wide angle end are changed so that the brake working positions can be adjusted to set the acceleration near the ends. The moving stroke end such as the telephoto end and the wide angle end can be a stroke end (that is, a mechanical end) based on the mechanical structure, or can be a stroke end (that is, soft limit) for control.

In the present embodiment, the braking characteristic near the end of the zooming operation area is represented as a pattern, and a plurality of braking characteristic patterns are preset. The braking characteristic data is stored in the memory 48. For the braking control pattern, a plurality of patterns can be preset, or a desired braking control pattern can be obtained by performing operations based on a parameter value when the parameter is input.

In FIG. 5, the pattern represented by reference character a is a pattern set at the initialization. The initialization pattern a corresponds to the parameter value of "0" of the braking control parameter.

The braking pattern b having a larger tilt angle than the initialization pattern a corresponds to the parameter value of "+1". The braking pattern c having a larger tilt angle than the braking pattern b corresponds to the parameter value of "+2". Furthermore, the braking pattern d having a smaller tilt angle than the initialization pattern a corresponds to the parameter value of "−1". The braking pattern e having a smaller tilt angle than the braking pattern d corresponds to the parameter value of "−2".

Thus, the initialization pattern a is defined as a reference (parameter value=0), the direction in which the absolute value of acceleration becomes larger is expressed by a plus (+) parameter value, and the direction in which the absolute value of acceleration becomes smaller is expressed by a minus (−) parameter value. By changing a parameter value, the settings of the braking pattern is changed.

FIG. 5 shows five braking patterns corresponding to the parameter values 0, ±1, and ±2, but the settings of a braking pattern can be a plurality of patterns equal to or larger than 2, and the number of patterns is not limited. In addition, the parameter value can be specified to be, for example, +1.5, etc.

Described below will be an operation of a TV lens configured as mentioned above.

In the system (first embodiment) shown in FIG. 4, the lens controller 52 is used also as the input device of a braking control parameter, and the indicator 14 is used as a display portion for checking the contents of a changed parameter.

By simultaneously pressing the switches SW1 and SW2, the displaying function of the indicator 14 is switched into the display mode of the braking control parameter. In this display status, the zooming operation unit of the lens controller 52 is operated, thereby selecting the brake working position while moving the zoom lens. In response to the zooming operation from the lens controller 52, the indicator 14 displays a braking control parameter in real time.

Figure 6:
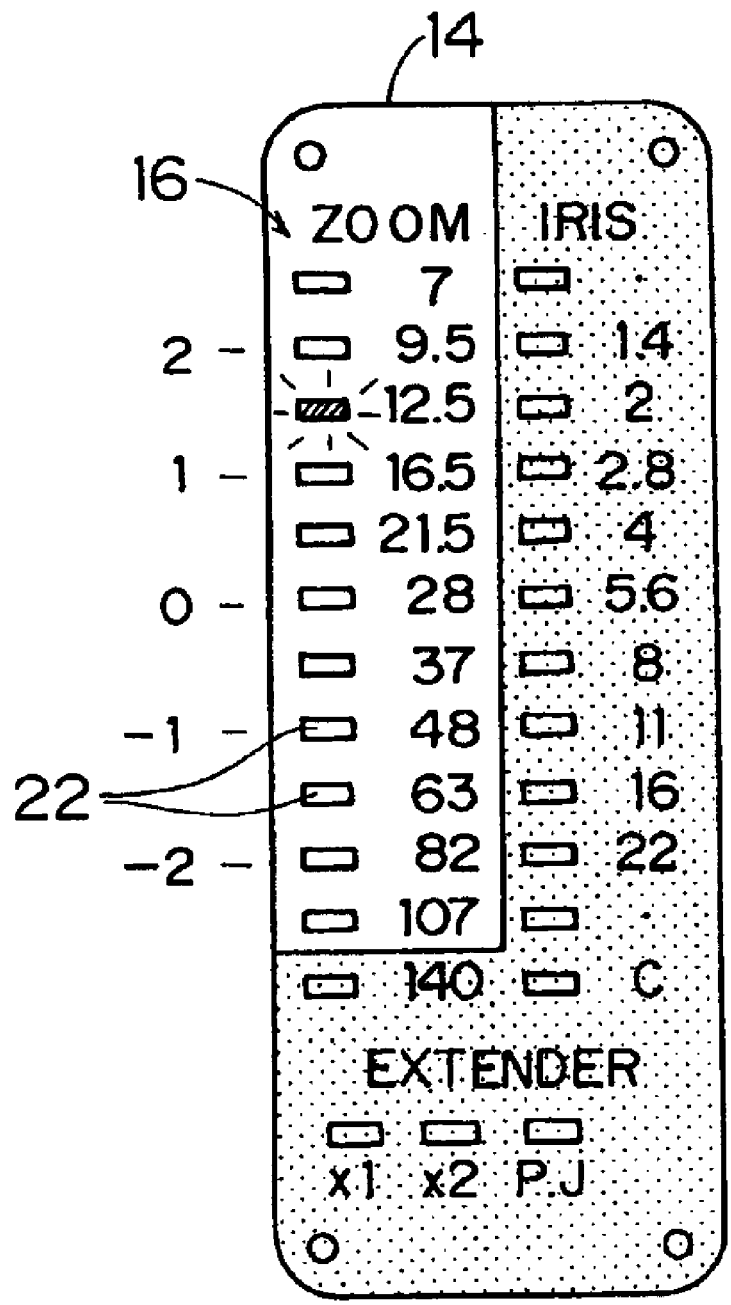
FIG. 6 shows an example of the display of a braking control parameter using an indicator.

FIG. 6 shows an example of showing a braking control parameter in the indicator 14. In FIG. 6, in the zoom display portion 16 of the indicator 14, the position indicating the focal length of 28 mm shows the parameter value=0, the position indicating the focal length of 16.5 mm shows the parameter value=+1, the position indicating the focal length of 9.5 mm shows the parameter value=+2, the position indicating the focal length of 48 mm shows the parameter value=−1, and the position indicating the focal length of 82 mm shows the parameter value=−2. The value of the braking control parameter can be checked depending on the lighting position of the lamp 22. In FIG. 6, the lamp 22 having the position of the focal length of 12.5 mm is lighted. In this case, the parameter value is +1.5.

At the position for which a desired parameter value is indicated, the switches SW1 and SW3 are simultaneously pressed to change the settings into the braking characteristic indicated by the parameter value.

Figure 7:
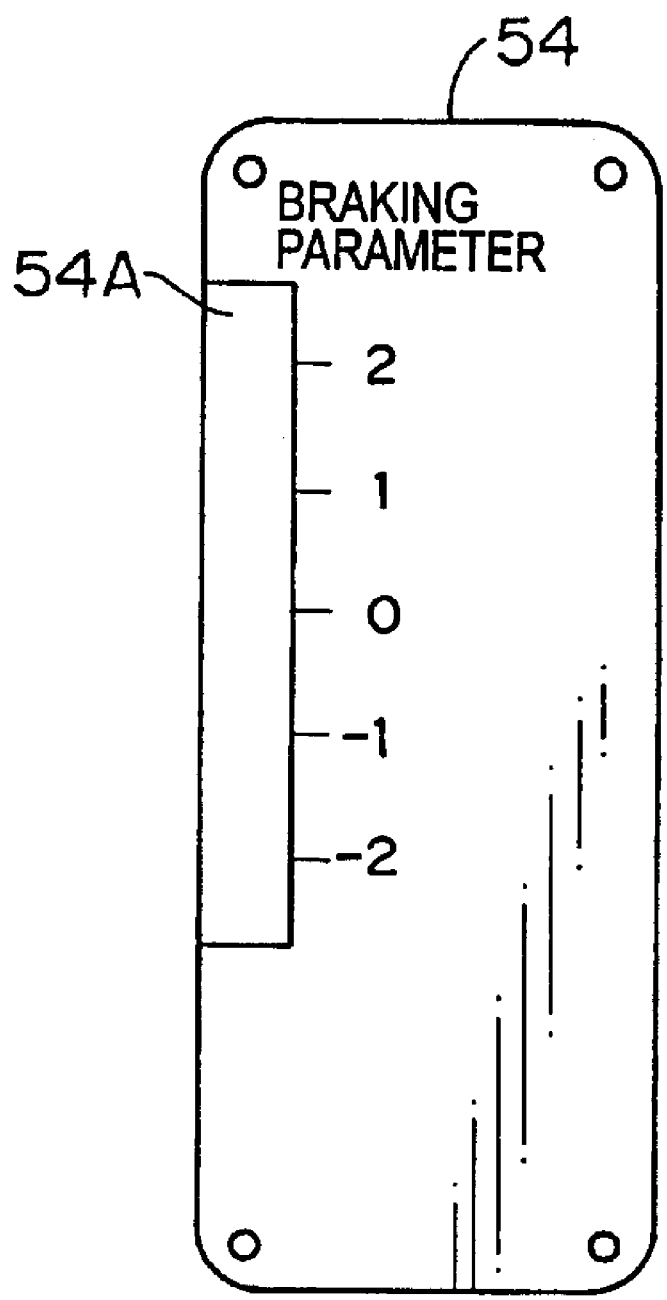
FIG. 7 shows an example of a plate for easier reading of an indicator.

Since the indicator 14 has the function of displaying the focal length of the zoom, and the function of displaying the braking control parameter, it is preferable that a plate 54 as shown in FIG. 7 is used to prevent the confusion of the displayed contents on the indicator 14. The plate 54 is used as overlapping the indicator 14 to cover the area other than the portion also used as the display portion of the braking control parameter in the displayed screens of the indicator 14. That is, the plate 54 has a portion 54A designed to be an aperture, a cutoff portion, or a transparent portion such that the portion also used as a display portion of the braking control parameter can be visually checked in the display screens of the indicator 14. The other portion of the plate 54 is not transparent, and is graduated in the parameter values correspondingly to the positions of the lamp 22 of the indicator 14.

When a braking control parameter is changed, the parameter value can be easily read by mounting the plate 54 as shown in FIG. 7 in the indicator 14 using a removal mount mechanism (for example, an attachment/detachment mechanism using a coupling structure, etc., a mechanism using a magnet, etc.) (not shown).

Figure 8:
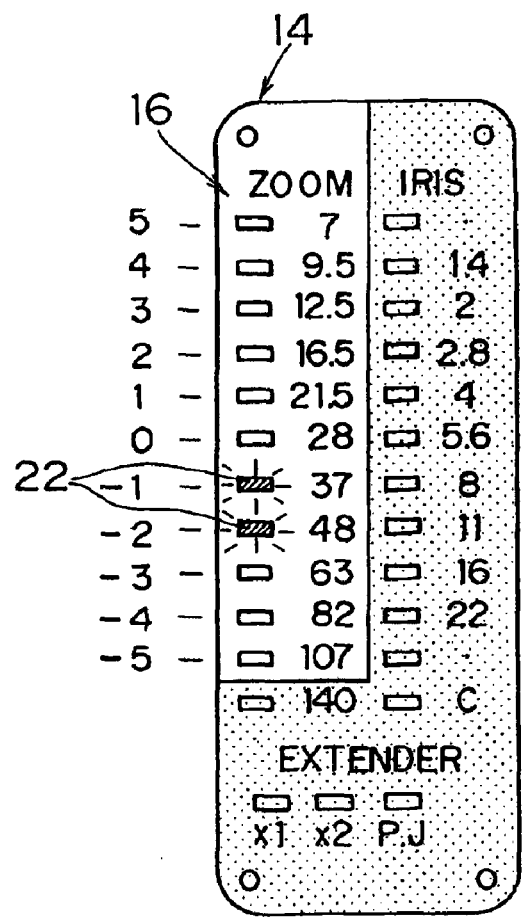
FIG. 8 shows another example of the display of the braking control parameter using an indicator.

FIG. 8 shows another example of displaying a braking control parameter in the indicator 14. In FIG. 8, the braking control parameter is displayed in the range of +5 to −5 using eleven lamps 22 for display with the focal length of 7 mm to 107 mm of the zoom display portion 16. Two adjacent lamps 22 are simultaneously lighted to display the intermediate value. FIG. 8 shows the lamp 22 at the position of the focal length of 37 mm and the lamp 22 of the focal length of 48 mm simultaneously lighted. In this case, the parameter value is −1.5.

According to the first embodiment of the present invention with the above mentioned configuration, the servo module 12 can set the braking characteristic not only when information can be received from the lens device 10 side, but also when information cannot be received from the lens device 10 side.

According to the present embodiment, the value of the braking control parameter is displayed using the zoom display portion 16 of the indicator 14. The iris display portion 18 can also be used to display it. In addition, the device for checking the setting of the braking control parameter is not limited to the indicator 14, but a display device such as a view finder, etc. for displaying the image of the camera can be used.

Figure 9:
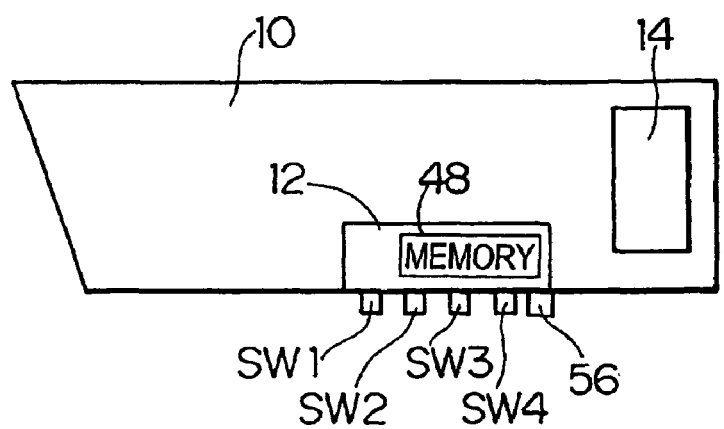
FIG. 9 shows a second embodiment of the present invention.

FIG. 9 shows a second embodiment of the present invention. Each constituting element also shown in FIG. 3 is assigned the same reference character, and the detailed explanation is omitted here. The servo module 12 shown in FIG. 9 comprises an input switch 56 corresponding to the input device of the braking control parameter. The input switch 56 is arranged at the position so that the input switch 56 can be operated even when the servo module 12 is mounted on the body of the lens device 10; for example, the input switch 56 is arranged at the bottom of the servo module 12 as shown in FIG. 9.

As an aspect of the input switch 56, a non-level input device such as a rotary dial system as shown in FIG. 10(A), a slide volume as shown in FIG. 10(B) can be applied. Otherwise, a switch designed as a switch bar 58 as shown in FIG. 10(C), which can be leaned from a neutral position toward a plus or minus direction, or a switch having a seesaw lever 59 as shown in FIG. 10(D), which can be slanted from a neutral position toward a plus or minus direction, can also be used in a step input type input device applied to the present invention.

According to the second embodiment shown in FIGS. 9 and 10(A)–10(D), the switches SW1 and SW2 are simultaneously pressed to switch the displaying function of the indicator 14 into the display mode of the braking control parameter. Then, by operating the input switch 56, the set parameter value is changed while checking the braking control parameter by the indicator 14. As compared with the first embodiment, the second embodiment has no operations of a zoom lens when a parameter value is selected, thereby saving the electric power.

FIG. 11 shows a third embodiment of the present invention. Each constituting element also shown in FIG. 3 is assigned the same reference character, and the detailed explanation is omitted here. The servo module 12 shown in FIG. 11 comprises an interface (I/F) connector 62 capable of transmitting and receiving data to and from a personal computer and other external devices (hereinafter referred to as an external terminal 60), and is connected to the external terminal 60 through an interface cable 64. When a transmitting device to transmit a signal through non-contact communications such as infrared communications is applied between the servo module 12 and the external terminal 60, the connection using the interface cable 64 is not required.

Figure 12:
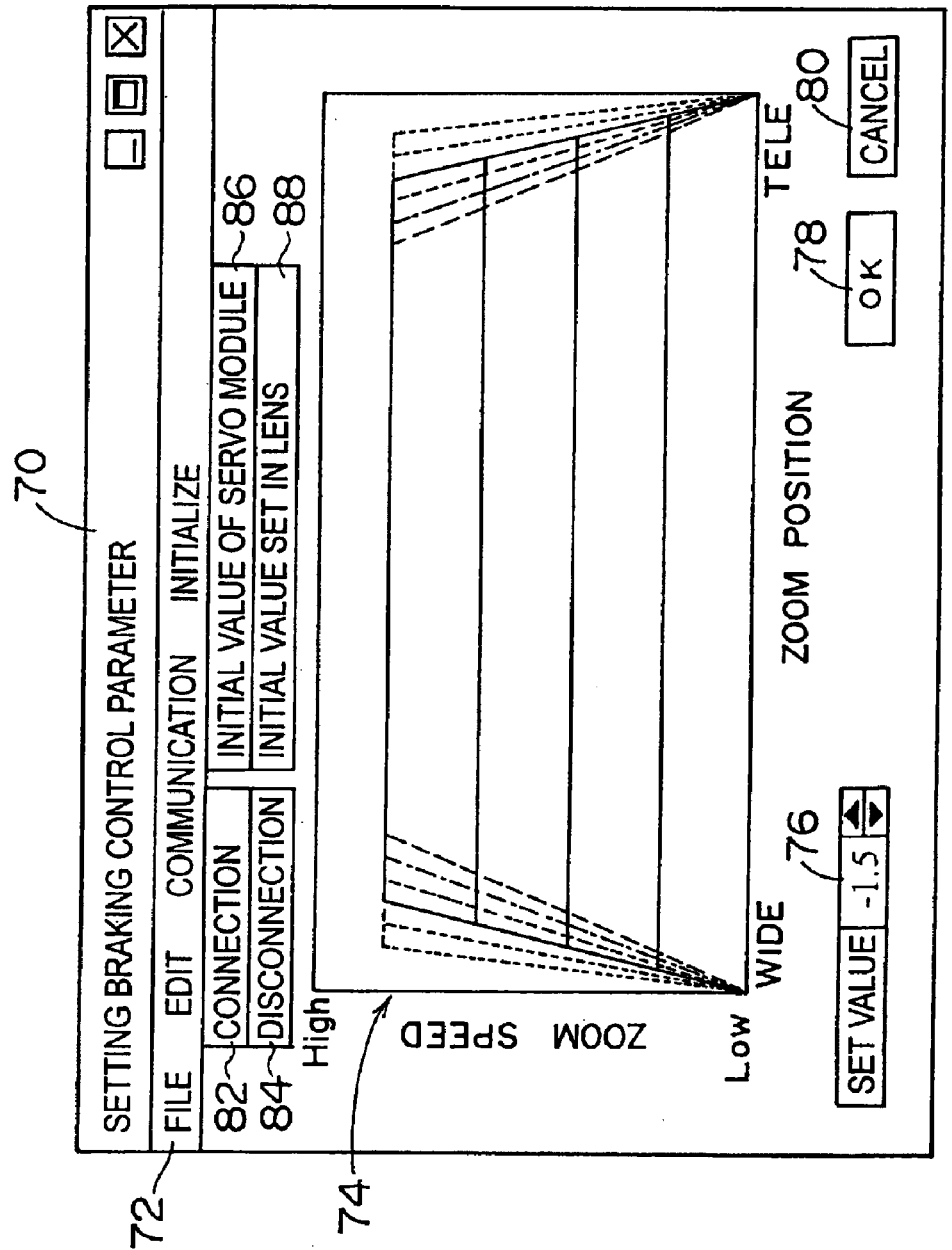
FIG. 12 shows an example of a parameter setting screen on a display portion of an external terminal shown in FIG. 11.

The external terminal 60 comprises an input device 66 such as a functions as the input device for the braking control parameter, and as the display device for checking the parameter. FIG. 12 shows an example of the parameter setting screen on the display device 68 of the external terminal 60.

In FIG. 12, reference numerals 70, 72, 74, 76, 78, and 80 denote a title bar, a menu bar, a display portion of a braking pattern, a parameter set value display portion, an OK button, and a cancel button, respectively. When the "communications" is selected from the menu bar 72, a pull-down menu containing a connection command 82 and a disconnection command 84 is displayed. When the item "initialization" is selected, a pull-down menu containing a command 86 to restore the braking control parameter to the initial value of the servo module, and a command 88 to restore the parameter value to the initial value set for the lens body is displayed.

Described below will be the setting procedure of the braking control parameter. When the external terminal 60 is activated, or when a connection command is executed, communications are established between the servo module 12 and the external terminal 60. The external terminal 60 reads the set value of the current braking control parameter from the servo module 12, and the result is displayed on the display device 68. Thus, the current settings are displayed.

To change the set value of a parameter, the left or right side (slope portion) of the graph of the braking pattern shown on the display portion 74 is dragged, or a value is directly input from the input device 66, the set value on the display of the parameter set value display portion 76 is changed, and the OK button 78 is selected or clicked, thereby setting a newly input parameter.

To initialize the set parameter value, either the command 86 to restore the parameter value to the initial value of the servo module from the pull-down menu displayed under the initial menu or the command 88 to restore the parameter value to the initial value set in the lens is selected, and the initialization is performed according to the command.

To restore the parameter value to the initial value set in the lens body, it is necessary to establish communications between the body of the lens device 10 and the servo module 12. Therefore, if the system is in the state in which the servo module 12 cannot receive the initial value from the lens device 10 side, the command 88 cannot be selected.

According to the third embodiment shown in FIGS. 11 through 13, the braking control parameter can be set through the communications with the servo module 12 using the external terminal 60. Therefore, the switch unit 50 (SW1 to SW4) of the servo module 12 can be omitted, the servo module can be smaller, and the arrangement and design for the operability of the switches SW1 to SW4 are not required.

In addition, according to the above-mentioned embodiments, the lens device 10 only has to supply power to the servo module 12. Therefore, a single servo module 12 as shown in FIG. 13 is enough to set the braking control parameter using the external terminal 60. In this case, a power supply 90 is connected to the servo module 12 as means for providing power for the servo module 12. Each constituting element in FIGS. 13 and 11 is assigned the same reference characters, and the detailed explanation is omitted here.

The aspect shown in FIG. 13 can be used in the production process of the servo module 12, and the setting operation of the braking control parameter of the servo module 12 can be simplified.

In the descriptions above, the braking characteristics can be simultaneously set at the telephoto end and the wide-angle end. However, the braking characteristic at the telephoto end can be separately set from the braking characteristic at the wide-angle end. Furthermore, the braking characteristic is not limited to a linear reduction control, but curved reduction control can be performed.

In the descriptions above, a zoom driving servo module has been described, but the present invention can also be applied to a drive portion of a focus lens and other moving lenses.

According to the present invention described above, the input device for inputting a signal for instruction to a lens drive device is provided to change the braking characteristic. Therefore, information can be received from the lens device side through communications, but also the lens drive device itself can set and change the braking characteristic even when communications cannot be established. Thus, the optimum braking characteristic can be set for each model of lens. In addition, by storing information (for example, the information indicating the values set at the delivery from the factory) about the initial settings of the braking characteristic in the storage device, the information can be read from the storage device as necessary, and the settings of the braking characteristic according to the information can be restored, thereby attain a general-purpose lens drive device.

Especially, the display portion such as an indicator, a view finder, etc. to be mounted in the lens device and a camera can also be used as a display device for checking the contents of the set values of the braking characteristic. Therefore, an additional display device is not required, and the resources on the lens and camera side can be effectively utilized.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens drive device to be detachably mounted to a lens device body, the detachable lens drive device comprising:
   a motor;
   a storage device which stores information prescribing a braking characteristic of a moving object driven by the motor;
   an input device which inputs a signal for changing the braking characteristics; and
   a braking characteristic setting device which changes settings of the braking characteristic according to the signal received from the input device,
   wherein a brake works before one of a wide angle end and a telephoto end can be changed,
   wherein the braking characteristic is an amount of acceleration at a time a lens is stopped at the telephoto end or at the wide angle end.

2. The lens drive device according to claim 1, wherein at least one of a lens status display portion attached to the lens device body and a display device which displays an image captured by a camera equipped with the lens device is used as a display device which confirms set contents of the braking characteristic.

3. A lens device on which the lens drive device according to claim 1 to be detachably mounted, comprising a display portion which displays a status of a lens and which is used as a display portion which displays information about settings of the braking characteristic.

4. A lens drive device to be detachably mounted to various types of lens device bodies, comprising:
   a motor portion for driving various types of moving objects;
   a storage portion for storing information prescribing braking characteristics of the various types of moving objects to be driven by the drive portion;
   an input portion for receiving a signal instructing a change in the braking characteristic;
   a braking characteristic setting portion for changing the settings of the braking characteristic according to the signal received in the input portion;
   a display portion attached to the various types of lens device bodies for displaying the status of the lens; and
   a switching portion for switching the display to correspond with the changing of the braking characteristic,
   wherein the braking characteristic is an amount of acceleration at a time a lens is stopped at the telephoto end or at the wide angle end.

* * * * *

UNITED STATES PATENT AND TRADEMARK OFFICE
CERTIFICATE OF CORRECTION

PATENT NO.    : 6,865,036 B1
DATED         : March 8, 2005
INVENTOR(S)   : Koshi Kuwakino It is certified that error appears in the above-identified patent and that said Letters Patent is hereby corrected as shown below:

<u>Title page,</u>
Item [73], Assignee: please change "Fuji Photo Film Co., Ltd." to -- Fuji Photo Optical Co., Ltd. --

Signed and Sealed this

Thirty-first Day of May, 2005

JON W. DUDAS
*Director of the United States Patent and Trademark Office*